(12) United States Patent
Saber et al.

(10) Patent No.: US 12,302,138 B2
(45) Date of Patent: May 13, 2025

(54) METHOD AND DEVICE FOR PDCCH REPETITION IN MULTI-TRP SYSTEM AND CORESET PRIORITIZATION

(71) Applicant: Samsung Electronics Co., Ltd., Gyeonggi-do (KR)

(72) Inventors: Hamid Saber, San Diego, CA (US); Jung Hyun Bae, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 455 days.

(21) Appl. No.: 17/677,373

(22) Filed: Feb. 22, 2022

(65) Prior Publication Data
US 2022/0361018 A1  Nov. 10, 2022

Related U.S. Application Data

(60) Provisional application No. 63/182,134, filed on Apr. 30, 2021, provisional application No. 63/225,808, (Continued)

(51) Int. Cl.
*H04W 72/04* (2023.01)
*H04W 24/08* (2009.01)
(Continued)

(52) U.S. Cl.
CPC ....... *H04W 24/08* (2013.01); *H04W 72/0446* (2013.01); *H04W 72/0453* (2013.01); *H04W 72/23* (2023.01); *H04W 72/51* (2023.01)

(58) Field of Classification Search
CPC ........... H04W 72/1268; H04W 72/044; H04W 72/23; H04W 72/0446; H04W 72/20; H04L 5/0005; H04L 5/0044; H04L 5/0091
See application file for complete search history.

(56) References Cited

U.S. PATENT DOCUMENTS 11,272,566 B2 *  3/2022  Nogami ................ H04W 76/27
2019/0297637 A1    9/2019  Liou et al.
(Continued)

FOREIGN PATENT DOCUMENTS

WO    WO 2022/163559    8/2022

OTHER PUBLICATIONS

Ericsson, "R1-1900728: On multi-TRP and multi-panel," 3GPP TSG RAN WG1 Ad-Hoc Meeting 1901, Jan. 21-25, 2019, Taipei, Taiwan (Year: 2019).*

(Continued)

*Primary Examiner* — Lan-Huong Truong
(74) *Attorney, Agent, or Firm* — The Farrell Law Firm, P.C.

(57) ABSTRACT

A method and a user equipment (UE) are provided for monitoring physical downlink control channel (PDCCH) candidates by a UE. A reference control resource set (CORESET) having a plurality of transmission configuration indicator (TCI) states is identified. The PDCCH candidates in the reference CORESET and in one or more CORESETs that overlap the reference CORESET in a time domain, are monitored. Each of the one or more CORESETs has a set of one or more TCI states that is either identical to, or a subset of, the plurality of TCI states of the reference CORESET. The monitored PDCCH candidates are received in accordance with a single frequency network (SFN) transmission scheme.

10 Claims, 9 Drawing Sheets

Related U.S. Application Data filed on Jul. 26, 2021, provisional application No. 63/275,170, filed on Nov. 3, 2021.

(51) Int. Cl.
| | |
|---|---|
| *H04W 72/0446* | (2023.01) |
| *H04W 72/0453* | (2023.01) |
| *H04W 72/23* | (2023.01) |
| *H04W 72/51* | (2023.01) |

(56) References Cited

U.S. PATENT DOCUMENTS

| | | |
|---|---|---|
| 2020/0153581 A1 | 5/2020 | Tsai et al. |
| 2020/0229008 A1* | 7/2020 | Islam .................... H04W 80/02 |
| 2021/0014837 A1* | 1/2021 | Papasakellariou .... H04W 72/23 |
| 2021/0051693 A1 | 2/2021 | Liou et al. |
| 2021/0321412 A1 | 10/2021 | Sakhnini et al. |
| 2021/0321442 A1 | 10/2021 | Jung et al. |
| 2024/0129097 A1* | 4/2024 | Li ......................... H04L 5/0035 |
| 2024/0205959 A1* | 6/2024 | Zhang ................... H04W 72/56 |

OTHER PUBLICATIONS

Qualcomm Incorporated, "Enhancements on HST-SFN Deployment", R1-2104657, 3GPP TSG-RAN WG1Meeting #104bis-e, May 10-27, 2021, 46 pages.

European Search Report dated Sep. 27, 2022 issued in counterpart application No. 22163557.6-1213, 14 pages.

\* cited by examiner

METHOD AND DEVICE FOR PDCCH REPETITION IN MULTI-TRP SYSTEM AND CORESET PRIORITIZATION

PRIORITY

This application is based on and claims priority under 35 U.S.C. § 119(e) to U.S. Provisional Patent applications filed on Apr. 30, 2021, Jul. 26, 2021, and Nov. 3, 2021, in the United States Patent and Trademark Office, and assigned Ser. Nos. 63/182,134, 63/225,808, and 63/275,170, respectively, the contents of which are incorporated herein by reference.

FIELD

The present disclosure relates generally to multiple-input multiple-output (MIMO) transmission schemes, and more particularly, to transmission schemes for physical downlink control channel (PDCCH) transmission from multiple transmission and reception points (TRPs) to schedule a same channel.

BACKGROUND

MIMO transmission schemes have been widely used in digital communication to increase the capacity of wireless channels. The $3^{rd}$ Generation Partnership Project (3GPP) mobile communication standard supports MIMO transmission schemes in which a PDSCH or physical uplink shared channel (PUSCH) is transmitted from different physical antennas or different antenna ports.

Different antenna ports of a MIMO transmission scheme may be within a single TRP, in which case the scheme is referred to as a single TRP transmission scheme. Different antenna ports of one or different channels may also be within multiple TRPs, which are typically non-co-located, in which case the scheme is referred to as a multi-TRP (M-TRP) scheme. An example of the M-TRP scheme includes a rank-2 PDSCH transmitted by two antenna ports, where a first antenna port is within a first TRP and a second antenna port is within a second TRP.

M-TRP transmissions can be categorized into single-downlink control information (DCI)-TRP and multi-DCI M-TRP. With single-DCI M-TRP, a single PDCCH is transmitted from one of the TRPs and schedules one or more PDSCHs. In one transmission scheme, different layers of a single PDSCH are transmitted from different TRPs. In other transmission schemes, multiple PDSCHs (multiplexed in a time domain or a frequency domain) with the same transport block (TB) are transmitted, where all layers of a single PDSCH are transmitted from a respective one of the TRPs. Different PDSCHs may be transmitted from different TRPs according to a pattern.

FIG. 1 is a diagram illustrating a single-DCI M-TRP transmission scheme. A single DCI (PDCCH) 106 is transmitted to a user equipment (UE) 114 from a first TRP 102, and schedules a PDSCH 108 with two layers. A first layer 110 of the PDSCH is transmitted from a first antenna port within the first TRP 102, while a second layer 112 is transmitted from a second antenna port within a second TRP 104.

With multi-DCI M-TRP, each TRP transmits its own PDCCH, which schedules a PDSCH that is also transmitted from the ports within the same TRP.

FIG. 2 is a diagram illustrating multi-DCI M-TRP transmission. Each of the two TRPs, a first TRP 202 and a second TRP 204, transmits their own DCI (PDCCH), a first DCI 206 and a second DCI 208, respectively, to a UE 214. Each DCI schedules one PDSCH with two-layer transmission, a first PDSCH 210 and a second PDSCH 212. All of the layers of a given PDSCH are transmitted from the antenna ports within the same TRP.

Different multiplexing schemes can be applied for PDCCH transmission. The schemes include time division multiplexing (TDM), frequency division multiplexing (FDM), special division multiplexing (SDM), and single frequency network (SFN).

For a non-SFN M-TRP PDCCH transmission, the following schemes can be considered.

In a non-repetition scheme, one encoding/rate matching is for a PDCCH with two transmission configuration indicator (TCI) states. With this scheme, a single PDCCH candidate has two different TCI states. For example, specific control channel elements (CCEs)/resource element groups (REGs) of a candidate may be associated with a first TCI state and the remainder of the CCEs/REGs may be associated with a second TCI state.

In a repetition scheme, encoding/rate matching is based on one repetition, and the same coded bits are repeated for another repetition. Each repetition has the same number of CCEs and coded bits, and corresponds to the same DCI payload.

In a multi-chance scheme, separate DCIs schedule the same physical downlink shared channel (PDSCH)/physical uplink shared channel (PUSCH)/reference signal (RS)/transport block (TB)/etc., or result in the same outcome.

SUMMARY

According to one embodiment, a method is provided for monitoring PDCCH candidates by a UE. A reference control resource set (CORESET) having a plurality of TCI states is identified. The PDCCH candidates in the reference CORESET and in one or more CORESETs that overlap the reference CORESET in a time domain, are monitored. Each of the one or more CORESETs has a set of one or more TCI states that is either identical to, or a subset of, the plurality of TCI states of the reference CORESET. The monitored PDCCH candidates are received in accordance with an SFN transmission scheme.

According to one embodiment, a UE is provided that includes a processor and a non-transitory computer readable storage medium storing instructions. When executed, the instructions cause the processor to identify a reference CORESET having a plurality of TCI states, and monitor PDCCH candidates in the reference CORESET and in one or more CORESETs that overlap the reference CORESET in a time domain. Each of the one or more CORESETs has a set of one or more TCI states that is either identical to, or a subset of, the plurality of TCI states of the reference CORESET. The monitored PDCCHs are received in accordance with an SFN transmission scheme.

According to an embodiment, a method is provided for monitoring PDCCH candidates by a UE. A maximum number of monitoring occasions (MOs) of a first search space (SS) set permitted between a first MO of the first SS set and a second MO of a second SS set, is set. MOs of the first SS set and the second SS set are arranged in ascending order based on the set maximum number of MOs. The PDCCH candidates in the arranged MOs are received in accordance with the UE and the network communicating using a multi-TRP repetition scheme or a multi-TRP multi-chance scheme.

According to one embodiment, a UE is provided that includes a processor and a non-transitory computer readable storage medium storing instructions. When executed, the instructions cause the processor to set a maximum number of MOs of a first SS set permitted between a first MO of the first SS set and a second MO of a second SS set. First PDCCH candidates of the first MO are linked to second PDDCH candidates of the second MO. The instructions also cause the processor to arrange MOs of the first SS set and the second SS set in ascending order based on the set maximum number of MOs. The PDCCH candidates in the arranged MOs are received in accordance with the UE and the network communicating using a multi-TRP repetition scheme or a multi-TRP multi-chance scheme.

BRIEF DESCRIPTION OF THE DRAWINGS

The above and other aspects, features, and advantages of certain embodiments of the present disclosure will be more apparent from the following detailed description, when taken in conjunction with the accompanying drawings, in which.

DETAILED DESCRIPTION

Figure 1:
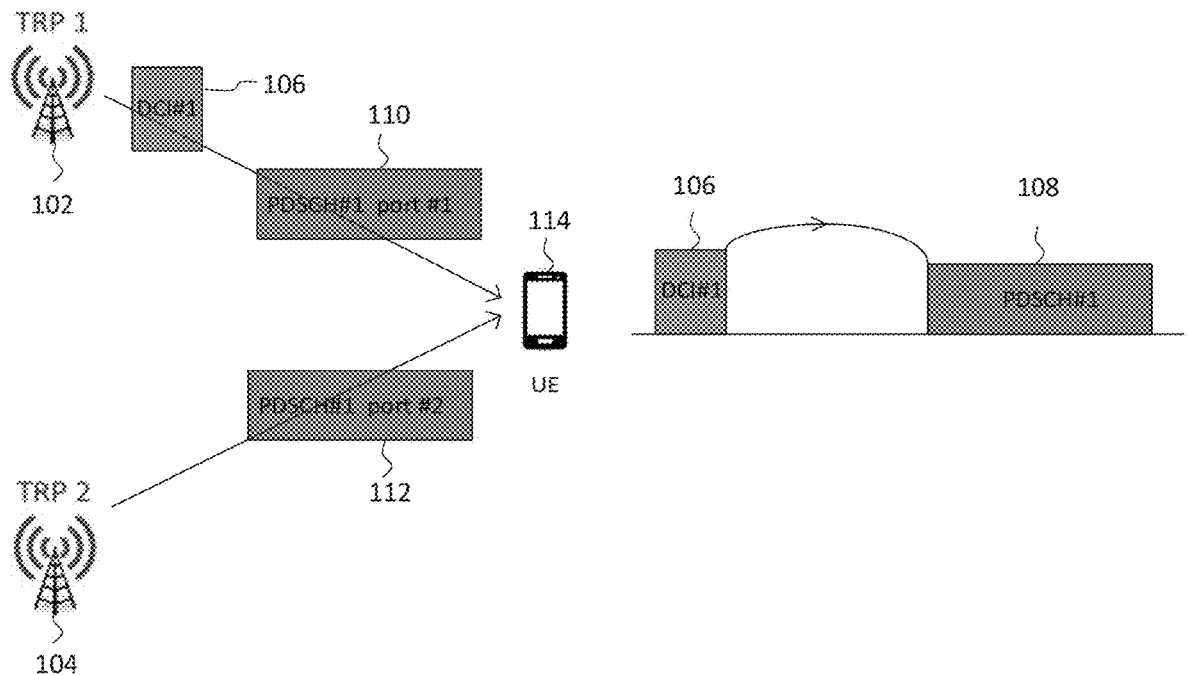
FIG. 1 is a diagram illustrating a single-DCI M-TRP transmission.
Figure 2:
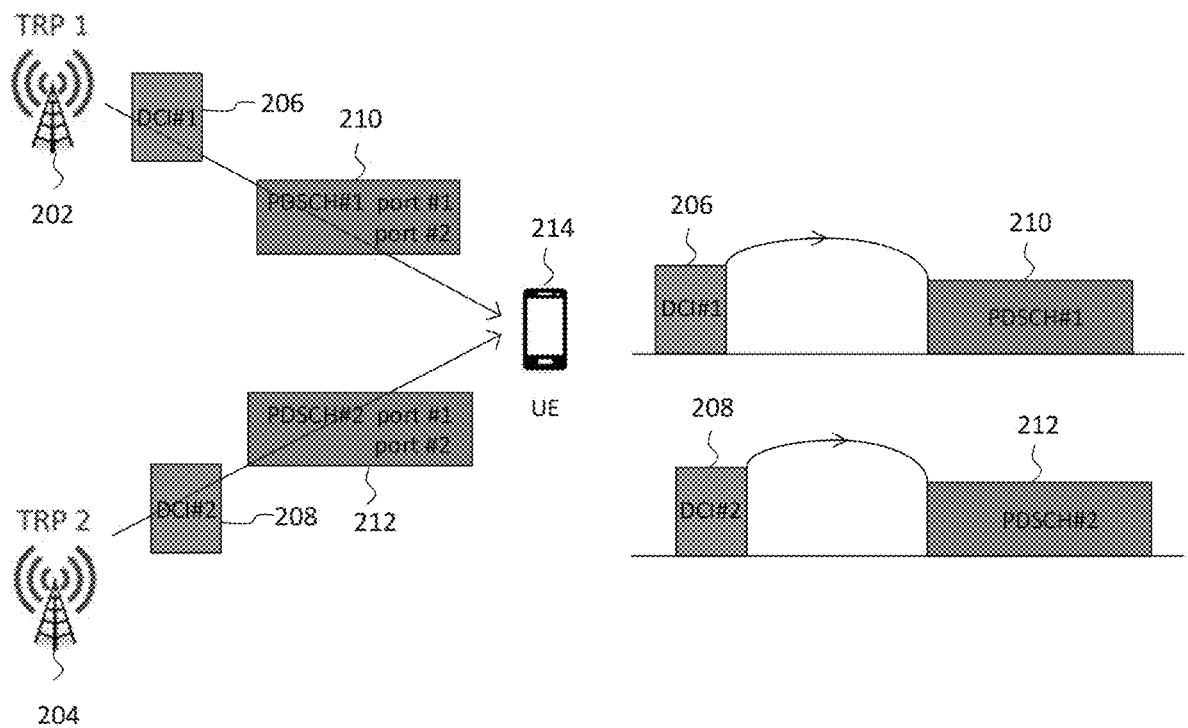
FIG. 2 is a diagram illustrating multi-DCI M-TRP transmission.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate the existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, such as, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

The present disclosure defines a new PDCCH prioritization rule that enables the UE to monitor overlapping PDCCHs with different TCI states. The present disclosure also provides restrictions on an SS configuration to address log-likelihood ratio (LLR) buffering, and blind decoding (BD)/CCE counting for inter-span repetitions.

The PDCCH prioritization rule is essential for efficient PDCCH monitoring in M-TRP systems with increased reliability of PDCCH, which is mainly due to beam diversity. Without such a prioritization rule, UE behavior is either undefined or the UE unnecessarily drops the overlapping PDCCH candidates with different TCI states. The prioritization rule assumes a capability at the UE side to monitor two different TC states at the same time. The SS configuration restrictions allow the UE to maintain a low LLR buffer size for PDCCH monitoring per slot. A BD/CCE counting rule for inter-span PDCCH monitoring allows per-span SS dropping.

Many of the embodiments described in detail below apply to both repetition and multi-chance schemes, and they may be considered the same scheme where the core feature is two linked PDCCHs providing the same information about scheduling a PDSCH.

Figure 3:
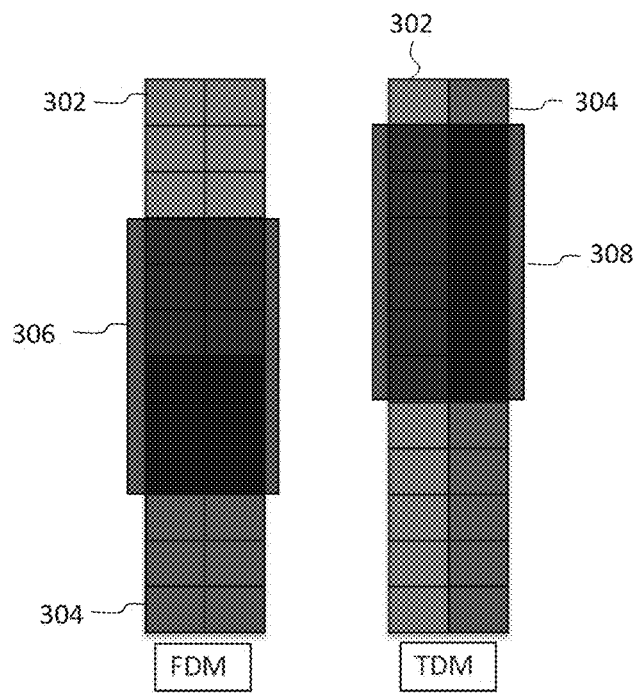
FIG. 3 a diagram illustrating PDCCHs according to the 1SS-1CORESET scheme, according to an embodiment.

In order to enable a PDCCH transmission with two different TCI states, one approach is to associate one CORESET with two different TCI states. This scheme is referred to as 1SS-1CORESET scheme. FIG. 3 is a diagram illustrating PDCCHs according to the 1SS-1CORESET scheme, according to an embodiment. Blocks 302 correspond to REGs/CCEs associated with a first TCI state, while blocks 304 correspond to REGs/CCEs associated with a second TC state. Accordingly, when using FDM, a first PDCCH (with DCI) 306 includes REGs/CCEs that are split evenly between the first and second TCI states. Similarly, when using TDM, a second PDCCH (with DCI) 308 also includes REGs/CCEs that are split evenly between the first and second TCI states.

Accordingly, the following schemes may be considered. In scheme A, a DCI or PDCCH candidate (in a given SS set) is associated with both TCI states of the CORESET. In scheme B, two sets of PDCCH candidates (in a given SS set) are associated with the two TCI states of the CORESET, respectively. In scheme C, two sets of PDCCH candidates are associated with two corresponding SS sets, where both SS sets are associated with the CORESET and each SS set is associated with only one TCI state of the CORESET.

For schemes B and C, the following cases may be considered for mapping between different PDCCH candidates with different TCI states. In case 1, Two or more PDCCH candidates are explicitly linked together (the UE knows the linking before decoding). In case 2, Two or more PDCCH candidates are not explicitly linked together (the UE does not know the linking before decoding).

Figure 4:
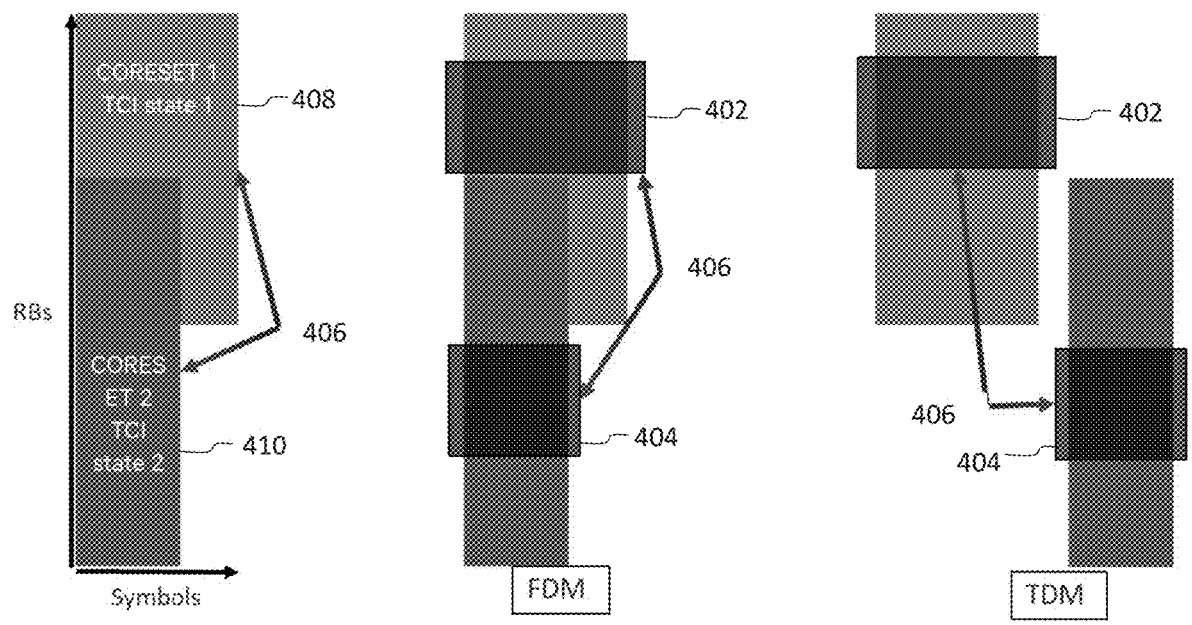
FIG. 4 is a diagram illustrating PDCCHs according to the 1SS-2CORESET scheme, according to an embodiment.

As an alternative to associating PDCCH candidates with two different TCI states, one SS set may be associated with two different CORESETs, where each CORESET is associated with a TCI state. This scheme is referred to as 1SS-2CORESET scheme. FIG. 4 is a diagram illustrating PDCCHs according to the 1SS-2CORESET scheme, according to an embodiment. A first PDCCH 402 and a second PDCCH 404 of a single SS set 406 are shown in a first CORESET 408 and a second CORESET 410, respectively, for both FDM and TDM.

Figure 5:
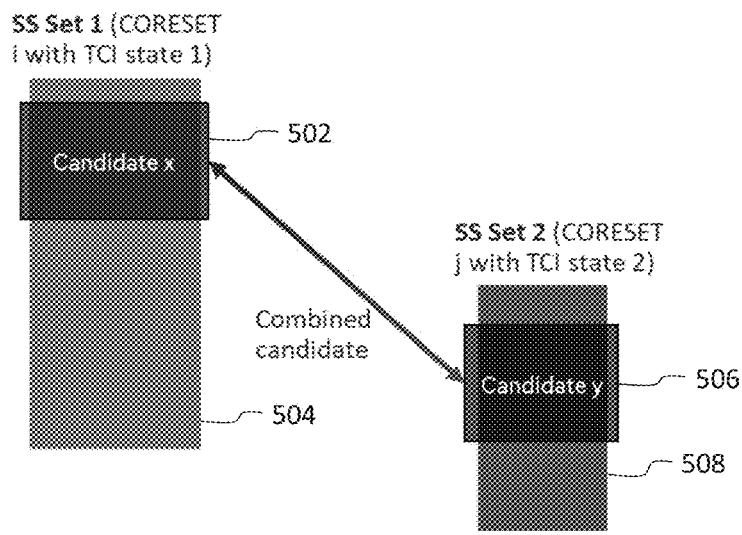
FIG. 5 is a diagram illustrating PDCCHs according to the 2SS-2CORESET scheme, according to an embodiment.

A different SS and CORESET multiplexing scheme is also possible to allow multiple TCI states for PDCCH candidates. With this scheme, referred to as 2SS-2CORESET scheme, two SS sets are associated with two CORESETs, where each CORESET is configured with a different TCI state. FIG. 5 is a diagram illustrating PDCCHs according to the 2SS-2CORESET scheme, according to an embodiment. Specifically, a first PDCCH 502 (candidate x) is from a first SS set and a first CORESET 504 having a first TCI state, while a second PDCCH (candidate y) 506 is from a second SS set and a second CORESET 508 having a second TCI state.

While embodiments of the disclosure generally relate to the 1SS-1CORESET scheme, the described methods may be applied to any SS-CORESET multiplexing scheme. The following methods may also be applied to both repetition and multi-chance PDCCHs.

Prioritization of PDCH Reception: TCI States Aspects

In 3GPP Rel-15/16, for different channels overlapping in time domain, there are procedures for the UE to determine channels to receive by certain prioritization rules. Once the UE determines a channel to receive, it will also determine all of the overlapping channels with the same TCI state to receive. With multi-TRP PDCCH schemes, a PDCCH candidate may be configured to be transmitted with two different TCI states, each corresponding to a specific TRP. In this case, the definition of the "same TCI state" needs to be clarified.

In 3GPP Rel-15/16, when the UE is configured with single cell operation or for intra-band carrier aggregation (CA), when UE monitors the PDCCH in one or multiple CORESETs on the same set of orthogonal frequency-division multiplexing (OFDM) symbols, where the CORESETs are configured with TCI states with quasi-colocation (QCL)-Type set to "typeD", the UE monitors PDCCH candidates in specific CORESETs and all the other CORESETs with the same value of QCL-Type.

The legacy rule is mainly suitable for when the CORESET/PDCCH candidates are configured with a single TCI state. In case of multiple TCI states, CORESET #1 may be configured with a TCI state pair with QCL-typeD pair ($a_1$, $b_1$) and CORESET #2 may be configured with a TCI state pair with QCL-typeD pair ($a_2$, $b_2$). In this case, specific rules are needed to determine if the two CORESETs can be categorized to have the same TCI states for the purpose of PDCCH prioritization.

Figure 6:
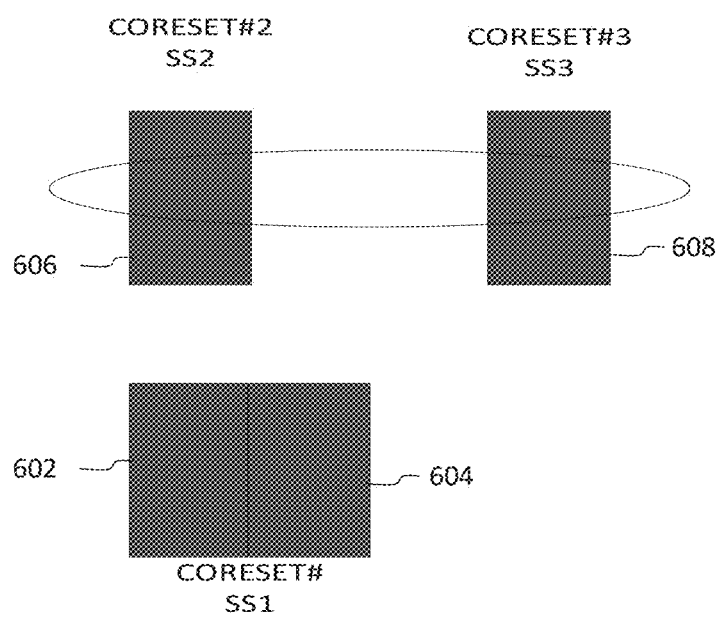
FIG. 6 is a diagram illustrating CORESETs, according to an embodiment.

FIG. 6 is a diagram illustrating CORESETs, according to an embodiment. First and second PDCCHs 602 and 604 are in a first CORESET and a first SS set and associated with two different TCI states. A third PDCCH 606 is in a second CORESET and a second SS and a fourth PDDCH 608 is in a third CORESET and a third SS. The second and third CORESETs are explicitly linked. The UE should be able to receive all PDCCH candidates in all shown CORESETs.

Multiple TCI states may be associated with a CORESET in the high-speed train (HST) and SFN transmission schemes. With an SFN PDCCH enhancement scheme, a CORESET is associated with two different TCI states and a PDCCH is transmitted such that the demodulation reference signal (DMRS) ports are associated with the same two different TCI states. The association of a CORESET with two different TCI states may be indicated by a medium access control (MAC)-control element (CE) command. The MAC-CE may activate a TCI codepoint with a single TCI state or multiple TCI states, which may be described as a single element, a pair, or m-tupple (e.g., m TCI states for one CORESET) by associating the TCI codepoints to a CORESET ID. In the prioritization procedure described below, it is assumed that a maximum of two TCI states are associated with the CORESET. However, embodiments are not limited thereto, and the procedure can be generalized to an arbitrary number of TCI states. A given PDCCH is then associated with a TCI state pair with qcl-typeD pair ($a_i$, $b_i$).

A reference CORESET is chosen as the CORESET that corresponds to a common search space (CSS) set with a lowest index in a cell with a lowest index containing CSS, if any. Otherwise, the reference CORESET is chosen as the CORESET that corresponds to a UE-specific search space (USS) set with a lowest index in a cell with a lowest index.

In a first method, a CORESET prioritization rule is provided for an SFN-based PDCCH and a reference CORESET with two TCI states. If the UE operates in a single cell or an intra-band CA, and is configured with multi-TRP SFN PDCCH, the UE applies the legacy rule to determine the CORESETs to monitor. In case that the reference CORESET is associated with two TCI states (a, b), the UE monitors all overlapping CORESETs associated with the same two states (a,b).

Simultaneous reception of two TCI states (QCL-D or beam) typically requires two antenna panels at the UE side, with a high likelihood that the two beams arrive at different panels. If the UE is capable of monitoring a CORESET with two different beams, it may also be capable of monitoring CORSETS with a single TCI state in any of the team beams.

In a second method, a CORESET prioritization rule is provided for an SFN-based PDCCH and a reference CORESET with two TCI states. If the UE operates in single cell or an intra-band CA, and is configured with multi-TRP SFN PDCCH, the UE applies the legacy rule to determine the CORESETs to monitor. In case that the reference CORESET is associated with two TCI states (a, b), the UE monitors all overlapping CORESETs associated with a single TCI state a, a single TCI state b, or a pair of TCI states (a, b).

Figure 7:
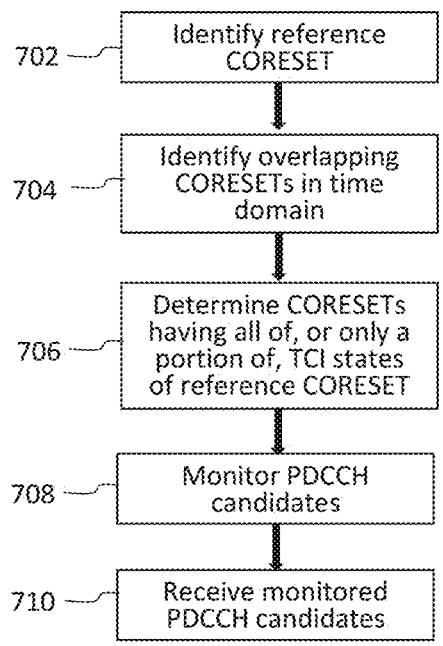
FIG. 7 is a flowchart illustrating a method for monitoring PDCCH candidates, according to an embodiment.

FIG. 7 is a flowchart illustrating a method of monitoring PDCCH candidates, according to an embodiment. At 702, a reference CORESET is identified that has a plurality of TCI states. At 704, CORESETs that overlap the reference CORESET in the time domain are identified. At 706, one or more CORESETs having all of, or only a portion of, the plurality of TCI states of the reference CORESET are determined from the identified CORESETs. Specifically, each of the one or more determined CORESETs has a set of one or more TCI states that is either identical to, or a subset of, the plurality of TCI states of the reference CORESET. At 708, PDCCH candidates in the reference CORESET and in the one or more determined CORESETs are monitored. At 710, the monitored PDCCH candidates are received in accordance with an SFN transmission scheme. As described above, the reference CORESET may have a total of two TCI states, however, embodiments of the disclosure are not limited thereto.

If the reference CORESET is associated with a single TCI state a, and the UE is capable of receiving two TCI states simultaneously (i.e., monitoring a CORESET with two different TCI states), the UE may also monitor overlapping CORESETs with two different TCI states where one of the TCI states is the same as that of the reference CORESET.

In a third method, a CORESET prioritization rule is provided for SFN-based PDCCH and a reference CORESET with a single TCI state. If the UE operates in single cell or an intra-band CA and is configured with multi-TRP SFN PDCCH, the UE applies the legacy rule to determine the CORESETs to monitor. In case that the reference CORESET is associated with a single TCI state a, the UE determines a CORESET, among the overlapping CORESETs, with two different TCI states (a, b) or (b, a), such that at least one of the two TCI states is the same as that of the reference CORESET.

If there are multiple such CORESETs, the chosen CORESET corresponds to the CSS set with the lowest index in the cell with the lowest index containing CSS, if any. Otherwise, the chosen CORESET corresponds to the USS set with the lowest index in the cell with the lowest index.

The UE monitors all overlapping CORESETs associated with the single TCI state a, the single TCI state b, or the pair of TCI states (a, b).

In a case of HST-SFN, or any other scenario where a CORESET is configured with two different TCI states, a CORESET with two TCI states should be prioritized over a CORESET with a single TCI state, regardless of the SS type and the serving cell index, to ensure the reliability of PDCCH reception by ensuring its monitoring for the special purpose it has been configured (e.g., beam diversity in M-TRP schemes).

In a fourth method, a reference CORESET with two TCI states is prioritized. If the UE operates in a single cell or an intra-band CA and is configured with multi-TRP SFN PDCCH, the UE applies the legacy rule to determine the CORESETs to monitor. The UE determines the reference CORESET among CORESETs with two different TCI states.

If multiple CORESETs with two TCI states exist, the reference CORESET corresponds to the CSS set with the lowest index in the cell with the lowest index containing CSS, if any. Otherwise, the reference CORESET corresponds to the USS set with the lowest index in the cell with lowest index.

The PDCCH transmission may be also configured to be in an FDM scheme where a CORESET is configured with two different TCI states. In this case, one PDCCH candidate may be associated with two different TCI states, or there may be PDCCH candidates in the CORESET which are linked together such that the linked PDCCH candidates have different single TCI states. In any case, a CORESET is associated with two different TCI states (a, b). Any of the methods described above for the SFN PDCCH scheme can also be applied to the FDM case.

With M-DCI M-TRP, the UE may declare a capability to receive two overlapping PDSCHs from the two TRPs, where the two PDSCHs are associated with different TCI states. This transmission scheme is typically scheduled by PDCCHs, which are transmitted from the same TRP as the PDSCHs. PDCCH association to the TRPs is based on a radio resource control (RRC) information element (IE) referred to CORESETPoolIndex, in the CORESET in which the PDCCH is transmitted. A UE with the aforementioned capability may also be capable of receiving/monitoring overlapping PDCCHs/CORESETs with different TCI states.

Since the current CORESET prioritization rule in Rel-15/16 does not support simultaneous reception of those PDCCHs, an enhancement may be required.

The simplest approach to define an enhancement is to resolve the PDCCH prioritization within a CORESET-PoolIndex value.

In a fifth method, a CORESET prioritization rule is provided for M-DCI M-TRP, per CORESETPoolIndex. If the UE operates in a single cell or an intra-band CA and is configured with a multi-DCI M-TRP PDSCH transmission scheme on a serving cell and each CORESET is associated with the TRPs according to the value of an RRC IE CORESETPoolIndex, the UE monitors the PDCCHs by applying the legacy PDCCH prioritization rule to all CORESETs that have the same value of CORESETPoolIndex. With two values of CORESETPoolIndex, the UE will determine a first set of PDCCHs in the first set of CORESETs with the first value, and a second set of PDCCHs in the second set of CORESETs with the second value. The UE monitors PDCCHs in both sets regardless of whether they overlap.

The above-described fifth method runs two different versions of the legacy algorithm. A first version for CORESETs with the value of CORESETPoolIndex=0 and a second version with CORESETs with the value of CORESETPoolIndex=–1. The method then monitors all CORESETs in any of the sets. For cells that are not configured with M-DCI M-TRP operation, CORESETs are not typically associated with a TRP. For the above-described method to work, those CORESETs, need to be associated with a TRP, through RRC configuration. If a gNB does not configure the association via RRC, CORESETs may be assumed to be associated with a specific TRP (e.g., the first TRP or the value of CORESETPooIndex=0).

The CORESETs on the M-DCI M-TRP cell may be of a higher priority and may need to be monitored always regardless of the SS type and serving cell index. Accordingly, the reference CORESET may be chosen from the CORESETs in the cell configured with M-DCI M-TRP.

A different PDCCH scheme is when every PDCCH candidate of a CORESET is transmitted with two different TCI states in a TDM manner, and the CORESET is configured with two different TCI states with the corresponding ($a_i$, $b_i$).

Thus, in a sixth method with a CORESET prioritization rule for TDM PDCCH, if the UE operates in single cell or intra-band CA and is configured with multi-TRP TDM PDCCH within one PDCCH candidate of the CORESET, the UE applies the legacy rule to determine the CORESETs to monitor with the following modification (a CORSET #i is configured with a TCI state pair with QCL-typeD pair).

When the UE determines the first CORESET with CSS or the USS, for the sake of determination of other CORESETs with the same QCL-typeD, a CORESET #1 is considered to have the same QCL-typeD as CORESET #2 if for every OFDM symbol on which UE monitors both CORESETs the QCL-typeD values of the PDCCH candidates of the two CORESETs are the same.

If CORESET #1 is chosen as the first monitored CORESET, a CORESET #2 is considered to have the same QCL-typeD as CORESET #1. This is because at every overlapping OFDM symbol, the QCL-typeD values of the PDCCH candidates of the two CORESETs are the same.

Figure 8:
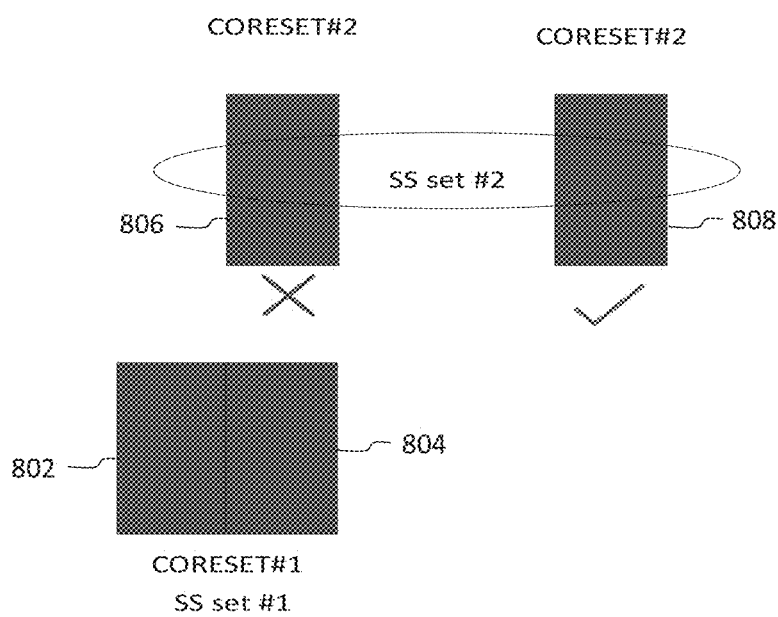
FIG. 8 is a diagram illustrating PDCCH candidates of an SS set, according to an embodiment.

A different PDCCH scheme is when the PDCCH candidates are linked together in the same or different SS sets. FIG. 8 is a diagram illustrating PDCCH candidates of an SS set, according to an embodiment. First and second PDCCHs 802 and 804 are in a first CORESET and a first SS set. A third PDCCH 806 is in a second CORESET and a second SS set. A fourth PDCCH 808 is in a second CORESET and a second SS set. PDCCH candidates of the second SS set are associated with the second CORESET such that a certain number of candidates are associated with the first QCL-typeD value of the CORESET and certain other candidates are associated with the second QCL-typeD value of the CORESET.

Assuming that the first CORSET is chosen to be monitored according to the legacy rule, the second CORESET may be considered to be partially monitored by the UE as certain candidates of the second CORESET do not overlap with those of the first CORESET with different QCL-typeD values. The following method is a conservative approach in which the UE does not monitor any candidates of the CORESET #2 in FIG. 8, even though some may not experience a QCL-typeD collision.

In a seventh method with a CORESET prioritization rule for TDM PDCCH (linked PDDCH candidates), if the UE operates in single cell or intra-band CA and is configured with multi-TRP TDM PDCCH, where the SS sets and the PDCCH candidates are linked together as repetition or multi-chance in a TDM scheme associated with the same CORESET, the UE applies the legacy rule to determine the CORESETs to monitor with the following modification (CORSET #i is configured with a TCI state pair with qcl-typeD pair).

When the UE determines the first CORESET with CSS or the USS, for the sake of determination of other CORESETs with the same QCL-typeD, a CORESET #1 is considered to have the same QCL-typeD as CORESET #2 if for every OFDM symbol on which UE monitors both CORESETs the QCL-typeD values of the PDCCH candidates of the two CORESETs are the same.

The above-described methods result in full dropping of a CORESET (SS) if any of its PDCCH candidates have a different QCL-typeD value on a symbol that overlaps with the first CORESET. Such schemes may unnecessarily drop the whole SS or CORESET even though the UE is capable of receiving some PDCCH candidates within them. For example, the UE can monitor the PDCCH in the second set of candidates of CORESET #1. This line of behavior can be realized by partial dropping of CORESETs.

In an eighth method with a general CORESET prioritization rule (partial monitoring: PDCCH candidate granularity: time domain (TD) overlapping), if the UE operates in single cell or intra-band CA and is configured with any of the multi-TRP PDCCH schemes, the UE applies the legacy rule to determine the CORESETs to monitor with the following modification.

When the UE determines the first CORESET with CSS or the USS, for the sake of determination of other CORESETs with the same QCL-typeD, the UE monitors PDCCH candidates in SS sets corresponding to the second CORESET if the PDCCH candidate of the second CORESET does not overlap in time with any PDCCH candidate of the first CORESET, such that the two candidates are associated with two different values QCL-typeD on the same symbol.

Technically, the UE may still be able to monitor two different PDCCH candidates from the two CORESETs if the two candidates have the same QCL-typeD on the overlapping resource elements (REs). The following method defines UE behavior based on this approach.

In a ninth method with a general CORESET prioritization rule (partial monitoring: PDCCH candidate granularity: TD and frequency domain (FD) overlapping), if the UE operates in single cell or intra-band CA and is configured with any of the multi-TRP PDCCH schemes, the UE applies the legacy rule to determine the CORESETs to monitor with the following modification.

When the UE determines the first CORESET with CSS or the USS, for the sake of determination of other CORESETs with the same QCL-typeD, the UE monitors PDCCH candidates in SS sets corresponding to the second CORESET if the PDCCH candidate of the second CORESET does not overlap with any PDCCH candidate of the first CORESET in both time and frequency domain, such that the two candidates are associated with two different values of QCL-typeD on same REs.

The eighth and ninth methods describe PDCCH monitoring in the second CORESET on a PDCCH candidate level (i.e., the UE may monitor some PDCCH candidates in the second CORESET and not monitor some others). Monitoring may also be defined on a CORESET level, as described in the methods below.

In a tenth method with a general CORESET prioritization rule (CORESET level granularity: TD overlapping), if the UE operates in single cell or intra-band CA and is configured with any of the multi-TRP PDCCH schemes, the UE applies the legacy rule to determine the CORESETs to monitor with the following modification.

When the UE determines the first CORESET with CSS or the USS, for the sake of determination of other CORESETs with the same QCL-typeD, the UE monitors PDCCH candidates in SS sets corresponding to the second CORESET if for every two PDCCH candidate #1 from the first CORESET and PDCCH candidate #2 from the second CORESET, the two candidates do not overlap in time with two different values of QCL-typeD on the same symbols.

In an eleventh method with a general CORESET prioritization rule (CORESET level granularity: TD and FD overlapping), if the UE operates in single cell or intra-band CA and is configured with any of the multi-TRP PDCCH schemes, the UE applies the legacy rule to determine the CORESETs to monitor with the following modification.

When the UE determines the first CORESET with CSS or the USS, for the sake of determination of other CORESETs with the same QCL-typeD, the UE monitors PDCCH candidates in SS sets corresponding to the second CORESET if for every two PDCCH candidate #1 from the first CORESET and PDCCH candidate #2 from the second CORESET, the two candidates do not overlap in both time or frequency with two different values of QCL-typeD on the same REs.

Restriction on Soft Combining

As described above, one of the options for non SFN M-TRP PDCCH transmission is repetition, as described below.

Encoding/rate matching is based on one repetition, and the same coded bits are repeated for the other repetition. Each repetition has the same number of CCEs and coded bits, and corresponds to the same DCI payload.

In this case, a soft combining operation may happen at a UE to handle such repetitions. There may be a potential complexity of a soft combining operation of PDCCH due to its blind nature. Such soft combining would need to be done in a candidate-by-candidate manner, while acknowledging linkage between repetitions for every decoding attempt. Such candidate-by-candidate combining also implies that a UE needs to hold full LLR buffer of two separate SSs until decoding of all candidates is done. Hence, careful consideration would be necessary with option 2 to reduce implementation impact. For example, the number of BDs/CCEs corresponding to repetitions may need to be limited. In addition to a BD/CCE limit defined across all SSs and CORESETs, an additional limitation on BD/CCE for SSs and CORESETs corresponding to the repetitions may need to be considered. The amount of such limitation as well as necessity of such limitation may need to be declared by a UE as a UE capability. Since many BD candidates can exist in overlapping manner in each SS, an LLR buffer in terms of candidates typically becomes much larger than an LLR buffer in terms of CCE. Hence, a UE may need to store an LLR of a first repetition in terms of CCE, which implies that shuffling of LLR and restructuring buffer in terms of candidates would need to happen for both first and second repetition LLRs when soft combining is attempted. An impact of such doubling of processing needs to considered, and restriction on the number of BD/CCE corresponding to repetitions (e.g., up to half amount of per-slot BD/CCE limit), would be required. One way of handling such an increased burden can be using unused CA capability. This can be realized by using per-feature set per component carrier (FSPC)/per-feature set (FS)/per-band combination (BC) capability signaling for this functionality which are described below.

In any case, a situation in which a UE needs to hold an LLR buffer of first repetitions for long time, while a UE also needs to monitor other MOs including more of such first repetitions should be prevented. For example, with inter-slot repetition with two consecutive slots, the amount of the worst case memory corresponding to unresolved first repetitions and the current MO would be two times of per-slot BD/CCE limit, and such amount would further increase with larger distance between slots. Hence, SSs corresponding to such repetitions may need to be contained within one slot or within certain distance in time. Distance between SSs corresponding to such repetitions can be declared as UE capability. For example, support of inter-slot repetition can be declared as UE capability. To allow a UE to handle such increased burden by using unused CA capability, this can be realized by using per-FSPC/per-FS/per-BC capability signaling for this functionality which are described below. Alternatively, there may need to be restriction on the number of SS's or the amount of CCEs or candidates corresponding to first repetitions before the time instance including MOs with second repetitions. For example, a UE is not required to store more than per-slot BD/CCE limit at any given time.

UE capability signaling described in 5G new radio (NR) specification 38.306 and 38.822 refers to the mechanism with which the UE informs the gNB of its capability to perform certain features. The following is a (non-limiting) list of possible ways of reporting UE capability.

The UE can report its capability to perform certain features in any scenario. In this case, it is said that the UE reports its capability on a per-UE basis.

The UE can report its capability to perform certain features in particular bands. In this case, it is said that the UE reports its capability on a per-band basis.

The UE can report its capability to perform certain features in particular band combinations for CA. In this case, it is said that the UE reports its capability on a per-bandcombination or per-BC basis.

The UE can report its capability to perform certain features in specific band(s) in particular band combination for CA. In this case, a mechanism referred to as feature sets can be used to allow for such flexibility in reporting, and it is said that the UE reports its capability on a per-featureSet or per-FS basis in that case.

The UE can report its capability to perform certain features in specific component carrier(s) (CC) in particular band combination for CA. In this case, a mechanism referred to as feature sets per cc can be used to allow for such flexibility in reporting, and it is said that the UE reports its capability on a per-featureSet per cc or per-FSPC basis in that case.

In the above, band combination is collection of bands to represent CA configuration as described in 3GPP specification 38.101. From the first bullet to the last bullet in the above, a UE's flexibility for declaring support of certain features increase. For example, if feature A and feature B are per-FSPC, a UE can have full flexibility of supporting only one of feature A and B in each CC. However, if those features are per-UE, then a UE would always need to support or not support. Trade-off to added flexibility is its overhead in signaling. Hence, the determination of how certain feature is declared must acknowledge complexity of the feature in UE implementation and associated signaling overhead.

To maintain the UE LLR buffering issue complexity, the following methods are proposed for intra-slot PDCCH monitoring.

In a first method with a maximum number of early MOs, when the UE is configured with intra-slot PDCCH repetition, where a first set of PDCCH candidates in the first SS set are linked to the second set of PDCCH candidates in the second SS set, the first and second SS sets each include L MOs in the slots, where the PDCCH candidates of i-th MO of the first SS set are linked to the PDCCH candidates of the i-th MO of the second SS set. The L MOs of the first and second SS set are such that:

Ordering the MOs of each SS set in ascending order of the start or end symbol of the MO, for every i, the number of MOs of the first SS set which are between the i-th MO of the first SS set and i-th MO of the second SS set is less than or equal to M, where M is either fixed or RRC configured according to a UE capability.

A special case of first method is when the maximum number is equal to zero, which means that the two sets of MOs are fully intermixed.

Figure 9:
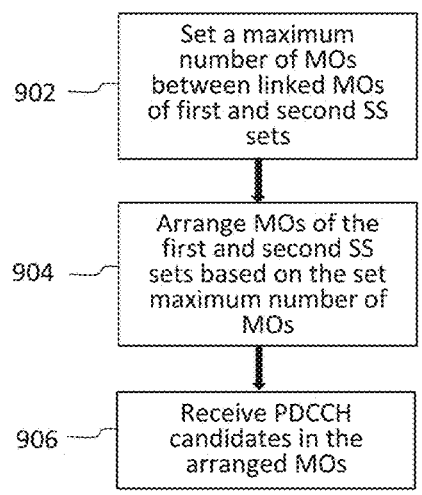
FIG. 9 is a flowchart illustrating a method for monitoring PDCCH candidates, according to an embodiment.

FIG. 9 is a flowchart illustrating a method of monitoring PDCCH candidates, according to an embodiment. At 902, a maximum number of MOs of a first SS set permitted between a first MO of the first SS set and a second MO of a second SS set, is set. The maximum number is set according to a capability of the UE. First PDCCH candidates of the first MO are linked to second PDCCH candidates of the second MO. Specifically each MO of the first SS set is linked to a respective MO of the second SS set. Additionally, a time between individual MOs in a linked pair of MOs is less than or equal to a preset time. At 904, MOs of the first SS set and the second SS set are arranged in ascending order based on the set maximum number of MOs. The ascending order is based on a start symbol or an end symbol of each of the MOs. At 906, the PDCCH candidates in the arranged MOs are received in accordance with the UE and a network communicating using a multi-TRP repetition scheme or a multi-TRP multi-chance scheme.

In a second method with two sets of MOs fully intermixed, when the UE is configured with intra-slot PDCCH repetition, where a first set of PDCCH candidates in the first SS set are linked to the second set of PDCCH candidates in the second SS set, the first and second SS sets each include L MOs in the slots, where the PDCCH candidates of i-th MO of the first SS set are linked to the PDCCH candidates of the i-th MO of the second SS set. The L MOs of the first and second SS set are such that:

Ordering the MOs of each SS set in ascending order of the start or end symbol of the MO, none of MOs of the first SS set is between i-th MO of the first SS set and i-th MO of the second SS set.

Figure 10:
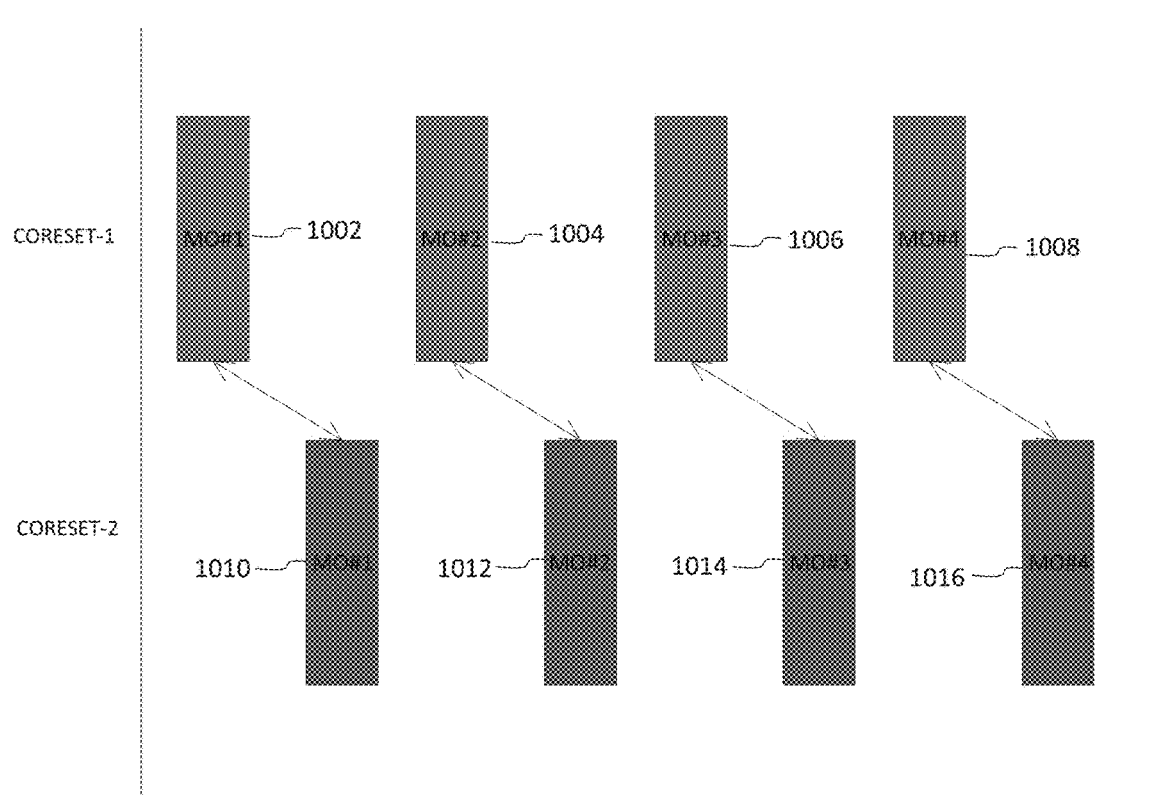
FIG. 10 is a diagram illustrating two sets of MOs fully inter-mixed, according to an embodiment.

FIG. 10 is a diagram illustrating two sets of MOs fully inter-mixed, according to an embodiment. First through fourth MOs 1002-1008 are of a first CORESET and SS set. Fifth through eighth MOs 1010-1016 are of a second CORESET and SS set. There is at most M=0 MOs for the first SS set, shown in red, between any two linked MOs one from the first SS set and one from the second SS set.

Figure 11:
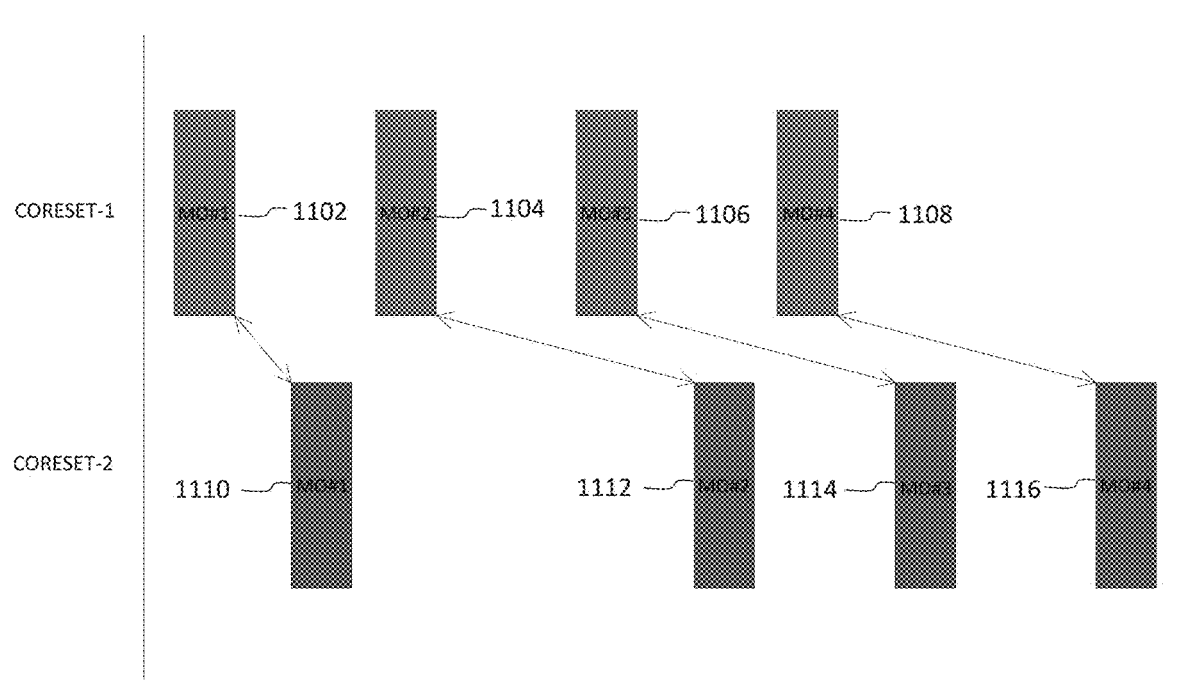
FIG. 11 is a diagram illustrating two sets of MOs fully inter-mixed, according to another embodiment.

FIG. 11 is a diagram illustrating two sets of MOs fully inter-mixed, according to another embodiment. Reference numerals 1102-1116 generally correspond to 1002-1016 and the corresponding description above with respect to FIG. 10. There is one MO of the first SS set which appears between the two MOs linked MOs (i.e., MO number 2).

The aforementioned methods may not be sufficient to mitigate the LLR buffering issue. One other aspect which may impact the issue, is the number of close/overlapping linked MOs.

Figure 12:
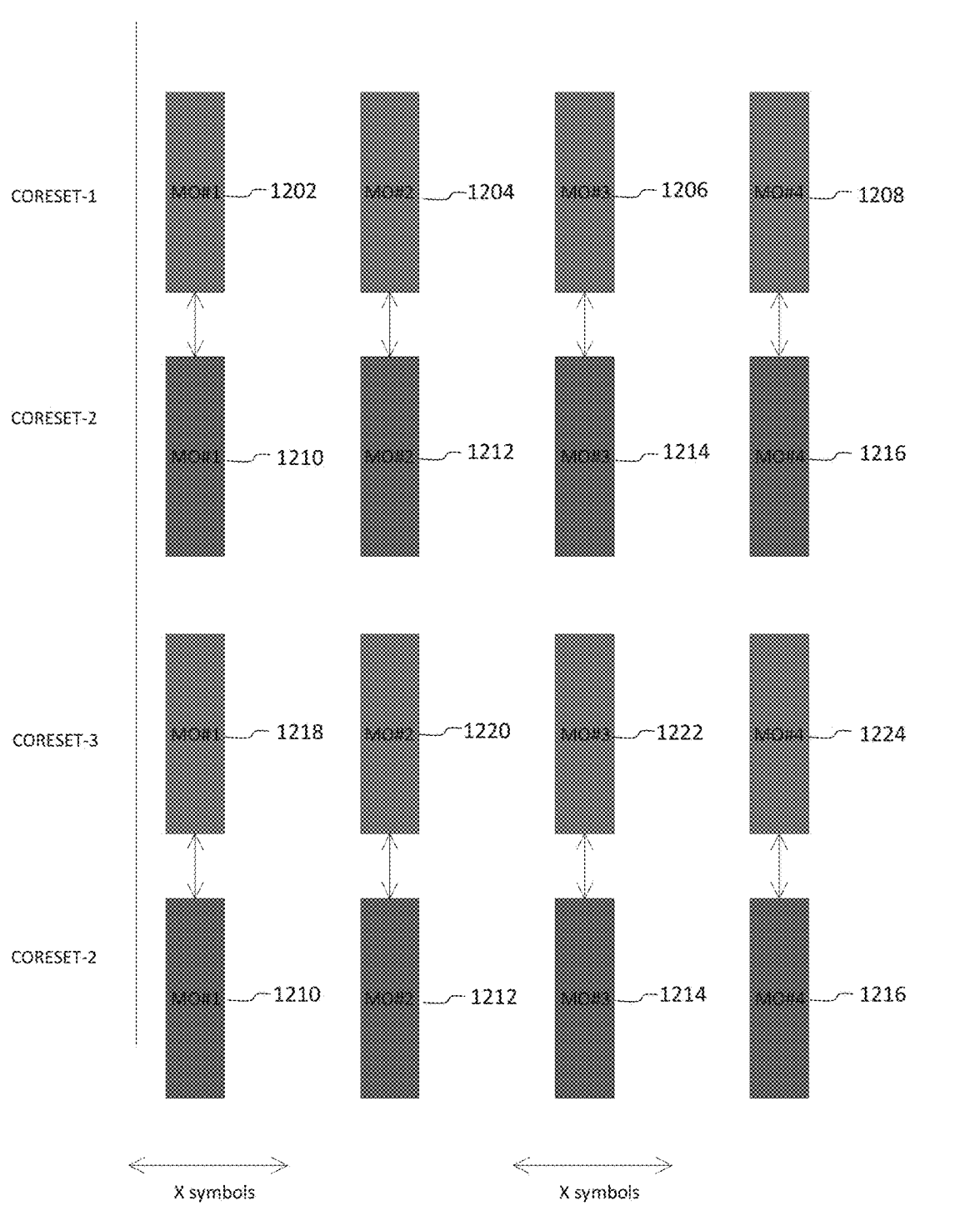
FIG. 12 is a diagram illustrating overlapping linked MOs, according to an embodiment.

FIG. 12 is a diagram illustrating overlapping linked MOs, according to an embodiment. Reference numerals 1202-1216 generally correspond to 1002-1016 and the corresponding description above with respect to FIG. 10. Ninth through twelfth MOs 1218-1214 are in a third CORESET. The UE would need to buffer LLRs for the four "first-repetition" MOs, which increases the buffering requirement significantly, even though the configuration satisfies the conditions in the second method, which is the most mitigating case. As a different approach, the maximum number of first-repetition MOs can be limited within any X symbols. Note that an MO is referred to as "first"-repetition MO if it is linked to another MO which starts later in time. In this case, the linked MO which starts later is referred to as "second-repetition" MO.

In a third method with a maximum number of first-repetitions within an interval, when the UE is configured with intra-slot PDCCH repetition, the maximum number of "first-repetition" MOs which are within an interval of X symbols is less than or equal to K, where K is either fixed or determined according to a UE capability. "First-repetition" MOs may include unlinked MOs (i.e., MOs not including linked candidates).

The interval of X symbols may be the PDCCH monitoring span, or any consecutive X symbols in the slot.

Alternatively, the upper bound K may only be applied when the "first-repetition" and the "second-repetition" are not within the same set of X symbols.

As an example, if the UE reports K=2, FIG. 12 is not supported, as the number of "first-repetition" within X symbols is 4.

In a fourth method with a maximum number of first-repetitions within a slot, a span, or a set of slots, when the UE is configured with PDCCH repetition, the maximum number of "first-repetition" MOs that are within a span, a slot, or a set of slots, which are linked to MOs that are in the next spans or slots, is less than or equal to K, where K is either fixed or determined according to a UE capability.

Alternatively, the upper bound K may only be applied when the "first-repetition" and the "second-repetition" are not within the same set of X symbols.

Another problematic scenario is when all the conditions provided by the aforementioned methods are satisfied, but the second-repetition MO is too close to a first-repetition MO which appears later in time.

Figure 13:
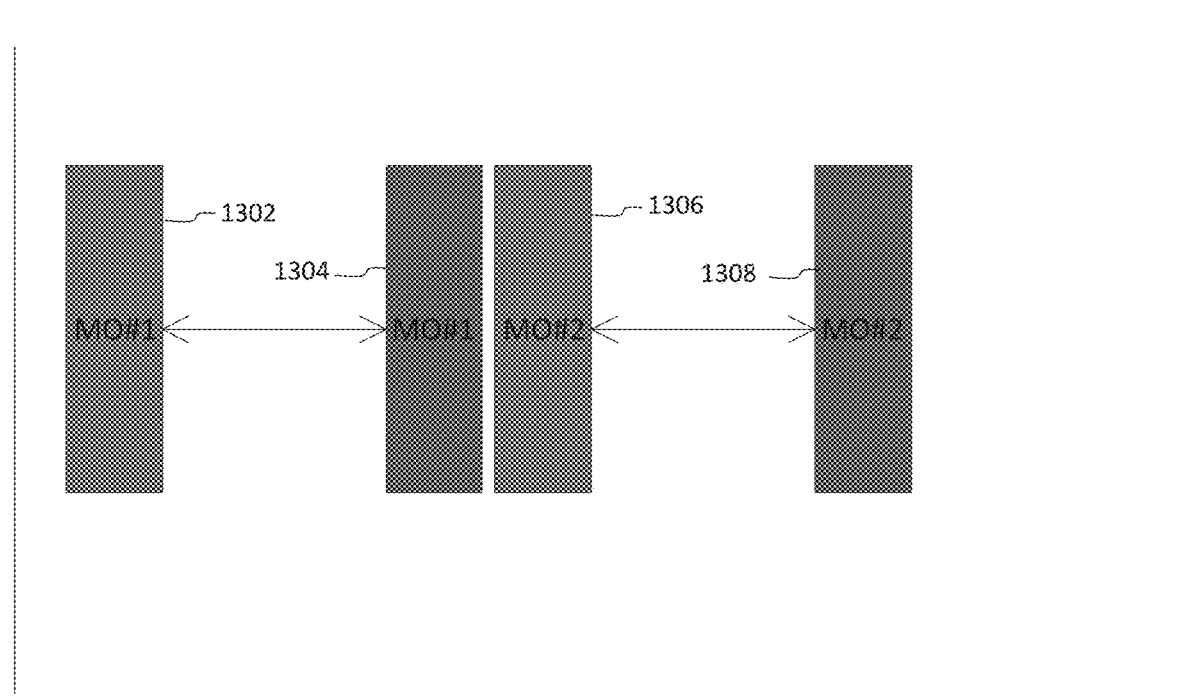
FIG. 13 is a diagram illustrating a second-repetition MO and a first repetition MO later in time, according to an embodiment.

FIG. 13 is a diagram illustrating a second-repetition MO and a first repetition MO later in time, according to an embodiment. The UE may not have sufficient time to finish processing of the two linked first MOs 1302 and 1304 before starting to monitor the linked second MOs 1306 and 1308. Therefore, it would need additional buffer for storing the LLRs of the second MO as the buffer of first MO may be still occupied. To mitigate the issue one approach is to introduce a minimum gap between second-repetition MO and a first-repetition MO which comes later in time.

In a fifth method with a minimum time gap between unlink first-repetition and second repetitions, when the UE is configured with intra-slot PDCCH repetition, and assuming ordering the MOs of the linked SS sets in ascending order of the start or end symbol of the MO, if a second-repetition MO #i of SS set 1 is linked to a second-repetition MO #i of SS set 2, the time gap from the end of the second-repetition to the start of the next first-repetition MO is at least K symbols, where K is either fixed number or determined according to the UE capability.

From a UE implementation point of view, a PDCCH candidate that is linked to a later candidate is "unresolved" until the linked candidate is not transmitted. This is due to the fact that the UE may need to store LLRs of the first repetition and process them jointly after reception of the second candidate. Similarly MOs can be considered as resolved or unresolved. Whether an MO is resolved or unresolved is a function of time.

In a sixth method with an unresolved PDCCH candidate or MO, when the UE is configured with PDCCH repetition, a first set of candidates are transmitted in the first MO, and a second set of candidates are transmitted in the second MO, which ends/starts later than the first MO, the first MO is unresolved at a given time, if the second MO doesn't end by that time. Unresolved MOs/candidates may include unlinked MOs/candidates (i.e., MOs not including linked candidates).

With the notion of resolved or unresolved MOs, a maximum number of unresolved MOs/candidates at a given time, or BD/CCE limits corresponding to unresolved candidates/MOs, may be limited to maintain UE complexity.

In a seventh method with a maximum number of unresolved MOs, when the UE is configured with PDCCH repetition, the maximum number of unresolved MOs at any check-point time is less than or equal to an upper limit. The check-point time may be arbitrary, a slot boundary, or a span boundary. With a slot/span boundary check point, there may be a limitation of the maximum number of MOs that are unresolved across slots/spans. In other words, there may be a limitation on a maximum number of MOs corresponding to a first repetition, where corresponding second repetitions are in a different slot/span.

As an example, the seventh method may be described in terms of unresolved MOs. The number of unresolved MOs at the end of each X symbols is less than or equal to K.

The notion of unresolved MOs can also be associated with the BD/CCE limit.

In an eighth method with a maximum unresolved BD/CCE limit, when the UE is configured with PDCCH repetition, the unresolved BD/CCE limit at any check-point time is less than or equal to an upper limit. The check-point time may be arbitrary, a slot boundary, or a span boundary. With a slot/span boundary check point, there may be a limitation of a maximum number of BD/CCE unresolved across slots/spans. In other words, there may be a limitation of a maximum number of BD/CCE corresponding to a first repetition, where corresponding second repetitions are in a different slot/span. When the UE reports to count every two linked PDSCCH candidate as $\gamma$ candidates, each candidate in an unresolved MO is counted as $\gamma_1$ and each candidate in the MO, which the unresolved MO is linked to is counted as $\gamma_2$, where $\gamma_1+\gamma_2=\gamma$. A special case is $$\gamma_1 = \gamma_2 = \frac{\gamma}{2}.$$

Span-Based PDCCH Monitoring: BD/CCE Limit for Inter-Span Repetition and Overbooking Since each PDCCH candidate can be associated to two TCI states, it may be needed to count a candidate more than once towards the BD/CCE limit. In particular, an FDM scheme requires simultaneous reception of two different TCI states, which may increase the PDCCH monitoring complexity. With repetition schemes, soft combining may be used for polar decoding. However, RE de-mapping to combine the LLRs may also increase the PDCCH monitoring complexity. With non-repetition schemes, each PDCCH may be counted separately regardless of repetition of the content of the DCI. Overall, PDCCH candidate counting should be revisited to account for multiple TCI states.

As described above, due to multiple TCI states involved in transmission/reception of one PDCCH, how to count the BD/CCE limits may be reconsidered to account for multiple TCI states.

When the UE is configured with inter-span or inter-slot PDCCH repetition, it must be specified how to count the linked PDCCH candidates across the spans or slots.

In a first method with a BD/CCE limit for inter-span or inter-slot repetition, when the UE is configured with inter-span or inter-slot repetition, if the UE counts every two linked PDCCH candidates as $\gamma$, the UE counts the first candidate as $\gamma_1$ and the second candidate as $\gamma_2$, where $\gamma_1+\gamma_2=\gamma$, if the two candidates are in different spans or slots. A special case is $$\gamma_1 = \gamma_2 = \frac{\gamma}{2}.$$

The UE may report $\gamma_1$, $\gamma_2$ separately as a UE capability. $\gamma$ may be implicitly reported as $\gamma=\gamma_1+\gamma_2$.

The UE counts the candidates in the first span or slot according to $\gamma_1$ and $\gamma_2$, and performs SS overbooking or dropping in the span/slot.

Figure 14:
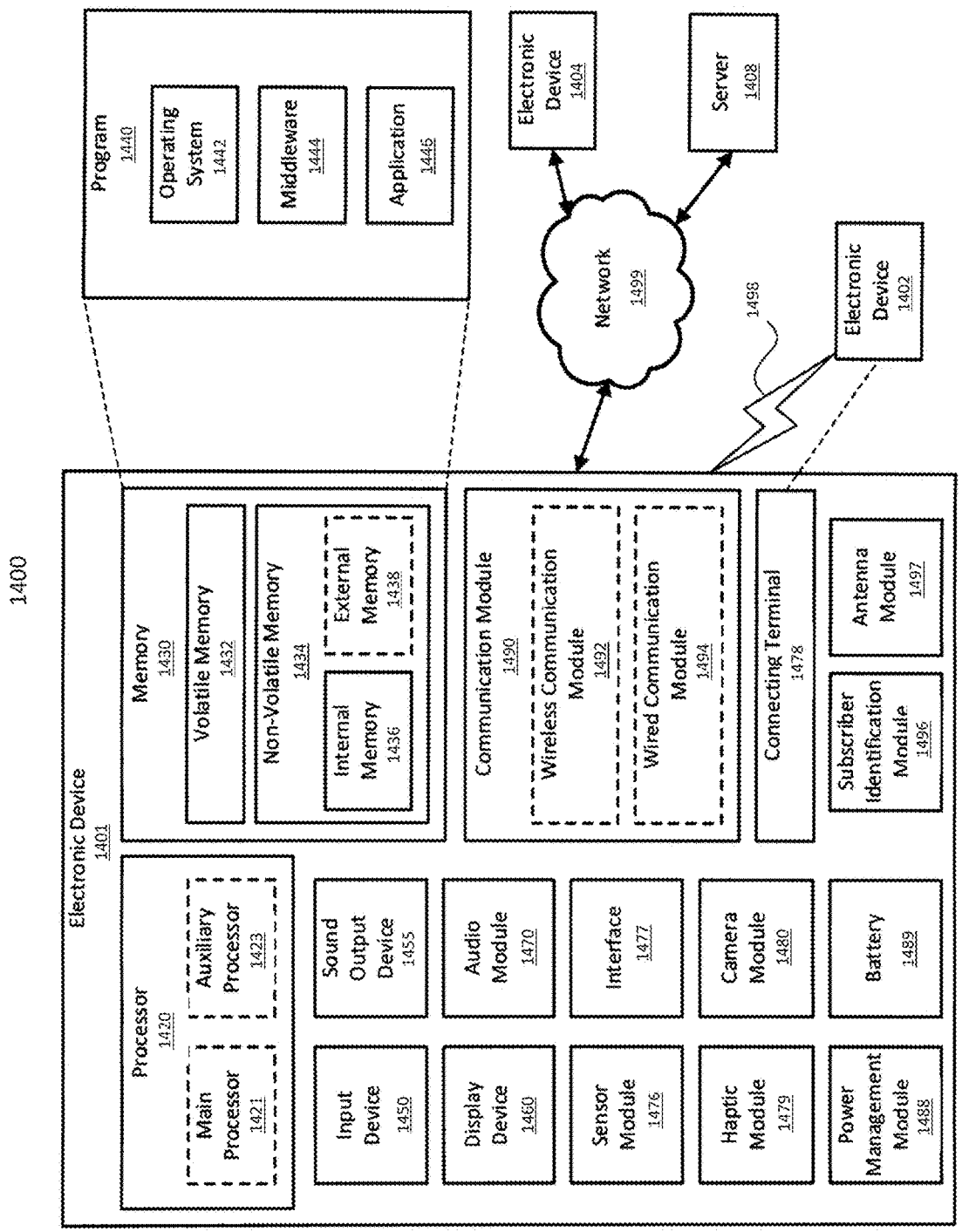
FIG. 14 is a block diagram of an electronic device in a network environment, according to an embodiment.

FIG. 14 is a block diagram of an electronic device in a network environment, according to one embodiment. Referring to FIG. 14, an electronic device 1401 in a network environment 1400 may communicate with an electronic device 1402 via a first network 1498 (e.g., a short-range wireless communication network), or an electronic device 1404 or a server 1408 via a second network 1499 (e.g., a long-range wireless communication network). The electronic device 1401 may communicate with the electronic device 1404 via the server 1408. The electronic device 1401 may include a processor 1420, a memory 1430, an input device 1450, a sound output device 1455, a display device 1460, an audio module 1470, a sensor module 1476, an interface 1477, a haptic module 1479, a camera module 1480, a power management module 1488, a battery 1489, a communication module 1490, a subscriber identification module (SIM) 1496, or an antenna module 1497. In one embodiment, at least one (e.g., the display device 1460 or the camera module 1480) of the components may be omitted from the electronic device 1401, or one or more other components may be added to the electronic device 1401. Some of the components may be implemented as a single integrated circuit (IC). For example, the sensor module 1476 (e.g., a fingerprint sensor, an iris sensor, or an illuminance sensor) may be embedded in the display device 1460 (e.g., a display).

The processor 1420 may execute, for example, software (e.g., a program 1440) to control at least one other component (e.g., a hardware or a software component) of the electronic device 1401 coupled with the processor 1420, and may perform various data processing or computations. As at least part of the data processing or computations, the processor 1420 may load a command or data received from another component (e.g., the sensor module 1476 or the communication module 1490) in volatile memory 1432, process the command or the data stored in the volatile memory 1432, and store resulting data in non-volatile memory 1434. The processor 1420 may include a main processor 1421 (e.g., a central processing unit (CPU) or an application processor (AP)), and an auxiliary processor 1423 (e.g., a graphics processing unit (GPU), an image signal processor (ISP), a sensor hub processor, or a communication processor (CP)) that is operable independently from, or in conjunction with, the main processor 1421. Additionally or alternatively, the auxiliary processor 1423 may be adapted to consume less power than the main processor 1421, or execute a particular function. The auxiliary processor 1423 may be implemented as being separate from, or a part of, the main processor 1421.

The auxiliary processor 1423 may control at least some of the functions or states related to at least one component (e.g., the display device 1460, the sensor module 1476, or the communication module 1490) among the components of the electronic device 1401, instead of the main processor 1421 while the main processor 1421 is in an inactive (e.g., sleep) state, or together with the main processor 1421 while the main processor 1421 is in an active state (e.g., executing an application). The auxiliary processor 1423 (e.g., an image signal processor or a communication processor) may be implemented as part of another component (e.g., the camera module 1480 or the communication module 1490) functionally related to the auxiliary processor 1423.

The memory 1430 may store various data used by at least one component (e.g., the processor 1420 or the sensor module 1476) of the electronic device 1401. The various data may include, for example, software (e.g., the program 1440) and input data or output data for a command related thereto. The memory 1430 may include the volatile memory 1432 or the non-volatile memory 1434.

The program 1440 may be stored in the memory 1430 as software, and may include, for example, an operating system (OS) 1442, middleware 1444, or an application 1446.

The input device 1450 may receive a command or data to be used by other component (e.g., the processor 1420) of the electronic device 1401, from the outside (e.g., a user) of the electronic device 1401. The input device 1450 may include, for example, a microphone, a mouse, or a keyboard.

The sound output device 1455 may output sound signals to the outside of the electronic device 1401. The sound output device 1455 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 1460 may visually provide information to the outside (e.g., a user) of the electronic device 1401. The display device 1460 may include, for example, a display, a hologram device, or a projector and control circuitry to control a corresponding one of the display, hologram device, and projector. The display device 1460 may include touch circuitry adapted to detect a touch, or sensor circuitry (e.g., a pressure sensor) adapted to measure the intensity of force incurred by the touch.

The audio module 1470 may convert a sound into an electrical signal and vice versa. The audio module 1470 may obtain the sound via the input device 1450, or output the sound via the sound output device 1455 or a headphone of an external electronic device 1402 directly (e.g., wired) or wirelessly coupled with the electronic device 1401.

The sensor module 1476 may detect an operational state (e.g., power or temperature) of the electronic device 1401 or an environmental state (e.g., a state of a user) external to the electronic device 1401, and then generate an electrical signal or data value corresponding to the detected state. The sensor module 1476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1477 may support one or more specified protocols to be used for the electronic device 1401 to be coupled with the external electronic device 1402 directly (e.g., wired) or wirelessly. The interface 1477 may include, for example, a high definition multimedia interface (HDMI), a universal serial bus (USB) interface, a secure digital (SD) card interface, or an audio interface.

A connecting terminal 1478 may include a connector via which the electronic device 1401 may be physically connected with the external electronic device 1402. The connecting terminal 1478 may include, for example, an HDMI connector, a USB connector, an SD card connector, or an audio connector (e.g., a headphone connector).

The haptic module 1479 may convert an electrical signal into a mechanical stimulus (e.g., a vibration or a movement) or an electrical stimulus which may be recognized by a user via tactile sensation or kinesthetic sensation. The haptic module 1479 may include, for example, a motor, a piezoelectric element, or an electrical stimulator.

The camera module 1480 may capture a still image or moving images. The camera module 1480 may include one or more lenses, image sensors, image signal processors, or flashes.

The power management module 1488 may manage power supplied to the electronic device 1401. The power management module 1488 may be implemented as at least part of, for example, a power management integrated circuit (PMIC).

The battery 1489 may supply power to at least one component of the electronic device 1401. The battery 1489 may include, for example, a primary cell which is not rechargeable, a secondary cell which is rechargeable, or a fuel cell.

The communication module 1490 may support establishing a direct (e.g., wired) communication channel or a wireless communication channel between the electronic device 1401 and the external electronic device (e.g., the electronic device 1402, the electronic device 1404, or the server 1408) and performing communication via the established communication channel. The communication module 1490 may include one or more communication processors that are operable independently from the processor 1420 (e.g., the AP) and supports a direct (e.g., wired) communication or a wireless communication. The communication module 1490 may include a wireless communication module 1492 (e.g., a cellular communication module, a short-range wireless communication module, or a global navigation satellite system (GNSS) communication module) or a wired communication module 1494 (e.g., a local area network (LAN) communication module or a power line communication (PLC) module). A corresponding one of these communication modules may communicate with the external electronic device via the first network 1498 (e.g., a short-range communication network, such as Bluetooth™, wireless-fidelity (Wi-Fi) direct, or a standard of the Infrared Data Association (IrDA)) or the second network 1499 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1492 may identify and authenticate the electronic device 1401 in a communication network, such as the first network 1498 or the second network 1499, using subscriber information (e.g., international mobile subscriber identity (IMSI)) stored in the subscriber identification module 1496.

The antenna module 1497 may transmit or receive a signal or power to or from the outside (e.g., the external electronic device) of the electronic device 1401. The antenna module 1497 may include one or more antennas, and, therefrom, at least one antenna appropriate for a communication scheme used in the communication network, such as the first network 1498 or the second network 1499, may be selected, for example, by the communication module 1490 (e.g., the wireless communication module 1492). The signal or the power may then be transmitted or received between the communication module 1490 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

Commands or data may be transmitted or received between the electronic device 1401 and the external electronic device 1404 via the server 1408 coupled with the second network 1499. Each of the electronic devices 1402 and 1404 may be a device of a same type as, or a different type, from the electronic device 1401. All or some of operations to be executed at the electronic device 1401 may be executed at one or more of the external electronic devices 1402, 1404, or 1408. For example, if the electronic device 1401 should perform a function or a service automatically, or in response to a request from a user or another device, the electronic device 1401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1401. The electronic device 1401 may provide the outcome, with or without further processing of the outcome, as at least part of a reply to the request. To that end, a cloud computing, distributed computing, or client-server computing technology may be used, for example.

One embodiment may be implemented as software (e.g., the program 1440) including one or more instructions that are stored in a storage medium (e.g., internal memory 1436 or external memory 1438) that is readable by a machine (e.g., the electronic device 1401). For example, a processor of the electronic device 1401 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method for monitoring physical downlink control channels (PDCCH) candidates by a user equipment (UE), the method comprising:
   setting a maximum number of monitoring occasions (MOs) of a first search space (SS) set permitted between a first MO of the first SS set and a second MO of a second SS set, wherein first PDCCH candidates of the first MO are linked to second PDCCH candidates of the second MO, and a time between linked MOs is less than or equal to a preset time;

arranging MOs of the first SS set and the second SS set in ascending order based on the set maximum number of MOs; and receiving the PDCCH candidates in the arranged MOs in accordance with the UE and a network communicating using a multi-transmission and reception point (TRP) repetition scheme or a multi-TRP multi-chance scheme.

2. The method of claim 1, wherein each MO of the first SS set is linked to a respective MO of the second SS set, and the UE is configured with intra-slot PDCCH repetition.

3. The method of claim 1, wherein the ascending order is based on a start symbol or an end symbol of each of the MOs.

4. The method of claim 1, wherein the maximum number is set according to a capability of the UE.

5. The method of claim 1, wherein, when the first PDCCH candidates and the second PDCCH candidates are in different spans or slots, and when the UE counts linked PDCCH candidates as $\gamma$, the first PDCCH candidates are counted as $\gamma_1$ and the second PDCCH candidates are counted as $\gamma_2$, where the sum of $\gamma_1$ and $\gamma_2$ is $\gamma$.

6. A user equipment (UE) comprising:

a processor; and a non-transitory computer readable storage medium storing instructions that, when executed, cause the processor to:

set a maximum number of monitoring occasions (MOs) of a first search space (SS) set permitted between a first MO of the first SS set and a second MO of a second SS set, wherein first PDCCH candidates of the first MO are linked to second PDCCH candidates of the second MO, and a time between linked MOs is less than or equal to a preset time;

arrange MOs of the first SS set and the second SS set in ascending order based on the set maximum number of MOs; and receive PDCCH candidates in the arranged MOs in accordance with the UE and a network communicating using a multi-transmission and reception point (TRP) repetition scheme or a multi-TRP multi-chance scheme.

7. The UE of claim 6, wherein each MO of the first SS set is linked to a respective MO of the second SS set, and the UE is configured with intra-slot PDCCH repetition.

8. The UE of claim 6, wherein the ascending order is based on a start symbol or an end symbol of each of the MOs.

9. The UE of claim 6, wherein the maximum number is set according to a capability of the UE.

10. The UE of claim 6, wherein, when the first PDCCH candidates and the second PDCCH candidates are in different spans or slots, and when the UE counts linked PDCCH candidates as $\gamma$, the first PDCCH candidates are counted as $\gamma_1$ and the second PDCCH candidates are counted as $\gamma_2$, where the sum of $\gamma_1$ and $\gamma_2$ is $\gamma$.

* * * * *